Jan. 31, 1956    H. A. MYERS    2,732,588
EXTRUDERS

Filed Aug. 7, 1951    2 Sheets-Sheet 1

INVENTOR:
H. A. MYERS
BY
*E. F. Kaul*
ATTORNEY

Jan. 31, 1956  H. A. MYERS  2,732,588
EXTRUDERS
Filed Aug. 7, 1951  2 Sheets-Sheet 2
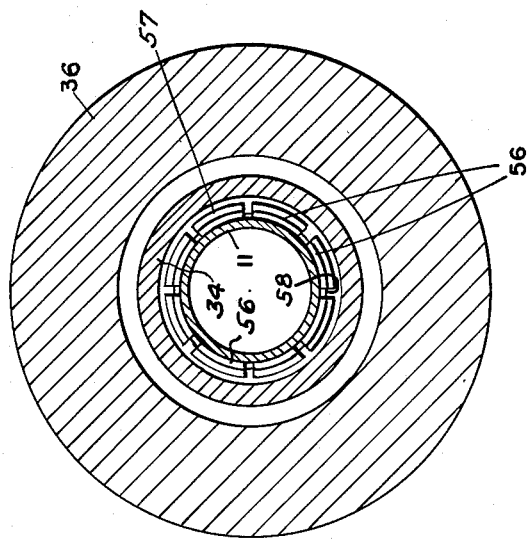
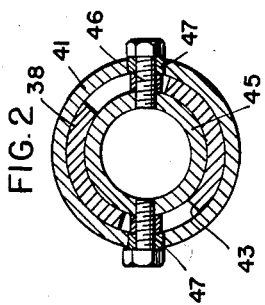
INVENTOR:
H. A. MYERS
BY
ATTORNEY

United States Patent Office 2,732,588
Patented Jan. 31, 1956

2,732,588

EXTRUDERS

Hubert A. Myers, North Riverside, Ill., assignor to Western Electric Company, Incorporated, New York, N. Y., a corporation of New York Application August 7, 1951, Serial No. 240,643

11 Claims. (Cl. 18—13)

This invention relates to extruders, and more particularly to tool-holders for extruding heads.

In the extrusion of insulating and jacketing compounds in the form of coverings on filaments, such as, for example, conductors and cable cores, the core usually is advanced through a core tube removably mounted in an extruding head of an extruder, and a die also removably mounted in the extruding head and the compound is forced between the die and the core tube to form the covering. Core tubes and dies of different sizes are used with the same extruder to cover cores of different sizes. With the apparatus of the prior art, it has been difficult to change or clean dies and core tubes in an extruder without considerable loss of time.

An object of the invention is to provide new and improved extruders.

A further object of the invention is to provide new and improved tool-holders for extruders.

Another object of the invention is to provide quick-detachable core tubes and dies and holding elements therefor.

An extruder illustrating certain features of the invention may include an extruding head having a socket therein, a core tube designed to fit into the socket and quick-detachable means for locking the core tube in the socket.

A complete understanding of the invention may be obtained from the following detailed description of an apparatus forming a specific embodiment thereof, when read in conjunction with the appended drawings, in which—

Fig. 2 is a vertical section taken along line 2—2 of Fig. 1, and

Fig. 3 is a vertical section taken along line 3—3 of Fig. 1.

Figure 1:
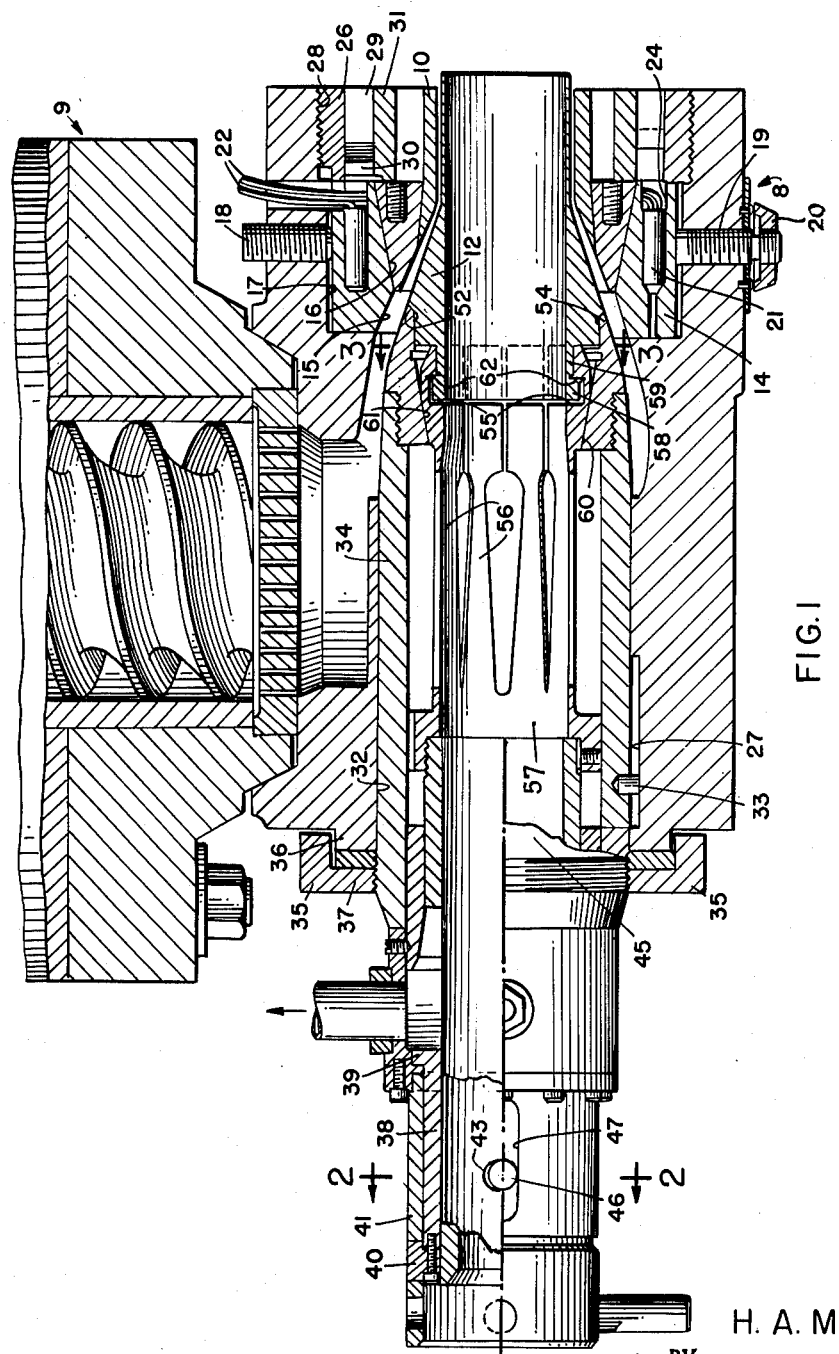
Fig. 1 is a fragmentary, horizontal section of an apparatus forming one embodiment of the invention.

Referring now in detail to the drawings, there is shown therein an extruding head 8 fitting on an extruding cylinder 9 having a quick-detachable tapered die 10 and a quick-detachable core tube 12. A die holder 14 having a tapered flow passage 15 and a tapered socket 16 fits loosely in a socket 17 in the head, and may be adjusted by adjustment screws 18 and adjustment screws 19 carrying dial gauges 20. Heating elements 21 are mounted in the die holder with conductors 22 leading from the heating elements along an annular groove 24. An outer locking ring 26 threaded into a tapped portion 28 of the socket 17 in the extruding head 8 has spaced cam lugs 29. Cam lugs 30 formed on an inner locking ring 31 engage the cam lugs 29 to hold the tapered die 10 firmly in the tapered socket 16, the two rings forming a breech-type lock. The ring 31 may be turned to move the lugs 30 out of engagement with the lugs 29 and the ring 31 removed, the lugs 30 moving freely between the lugs 29 as the die 10 is pulled out of the extrusion head.

A core tube holder 34 is mounted rigidly in a passage 32 in the extrusion head 8 by a splining pin 33 fitting in a slot 27 and a cap 35 threaded on a boss 36 of the head to hold a collar 37 threaded on the holder 34 against the end of the boss. To remove the core tube 12 from the holder 34, a cam sleeve 38 having end flanges 39 and 40 and cam slots 43 is turned in a stationary tube 41 to push a draw tube 45 to the right through followers 46 splining the core-tube-holder 34 to the tube 41. The followers 46 are slidable along longitudinal slots 47 in the tube 41. This pushes a tapered shoulder 52 on the core tube 12 away from a tapered socket 54 formed in the core tube holder 34 by means of shoulders 55 formed on spring fingers 56 of a collet 57 fastened to the draw tube 45 as the shoulders 55 push against a collar 58 formed on a shank 59 of the core tube. As the collet is moved to the right, cam portions 60 of the fingers slide along a tapered camming portion 61 of the core tube holder 34 and the fingers spring hooks 62 on the ends thereof clear of the collar 58 so that the core tube may be withdrawn from the extruding head. The juncture of the core tube and tip is positioned at the small end of the tapered passage 15 rather than farther into the extruding head to facilitate cleaning plastic material off the end of the end of the core tube and the tip in preparing to remove the tip from the extruding head.

To assemble the core tube 12 and the die 10 in the extruding head, the core tube is inserted into the core tube holder 34, and the collar 58 is pressed against the shoulders 55 on the fingers 56 of the collet 57. The cam sleeve then is turned to pull the draw tube 45 and the collet to the left, as viewed in Fig. 1, and the tapered camming portion 61 forces the hooks 62 behind the collar. The core tube then is released, and the draw tube is moved farther to the left to firmly seat the tapered shoulder 52 on the core tube in the tapered socket 54 in the core tube holder 34, which accurately positions the core tube and holds it in this position. The die 10 then is seated in the die holder 14, and is locked in position by insertion of the inner locking ring 31.

The die holder 14 may be adjusted laterally of its longitudinal axis by loosening the outer locking ring 26, manipulating the adjustment screws 18 and 19, and re-tightening the outer locking ring. The dial gauges 20 show the position of the die, and their readings for the optimum position of each of the various dies to be used in the extruder may be recorded to greatly facilitate setting up operations. The core tube 12 and the die 10 may be removed and replaced with another core tube and die in a very short time even though the core tube and the die may be so hot as they are removed that they can be held and manipulated by a gloved operator only a few seconds at a time. Thus, for such operations, the extruder need be shut down only a few minutes.

Certain features of the above-described apparatus are disclosed and claimed in copending application Serial No. 240,694, filed August 27, 1951, by G. S. Brown for "Extruders."

It is to be understood that the above-described arrangements are simply illustrative of the application of the principles of the invention. Numerous other arrangements may be readily devised by those skilled in the art

What is claimed is:

1. An extruder, which comprises an extruding head having a core passage and a socket concentric with the core passage, a core tube having a shank portion having a projection extending laterally thereof and designed to fit into the socket, and quick-detachable elongated draw means slidable in the passage and having a projection extending laterally thereof for engaging the projection on the shank portion to lock the core tube in the socket, said draw means extending from the exterior of the extruding head and being operable from the exterior of the head.

2. An extruder, which comprises an extruding head having a core passage extending therethrough and also provided with a socket, a core tube having a peripheral projection located on one end thereof and extending laterally outwardly, said core tube being designed to seat in the socket, a quick-detachable draw tube slidable in the core passage and having inward projections designed to bracket the projection on the core tube, and means located outside the extruding head for moving the draw tube along the passage to seat the core tube in the socket.

3. An extruder, which comprises an extruding head having a core passage extending therethrough and also provided with a socket, a draw tube mounted slidably in the core passage, a core tube designed to seat in the socket, quick-detachable means mounted on the entrance end of the core tube and the end of the draw tube for locking the core tube to the draw tube, and means located at the end of the core passage outside the extruding head for moving the draw tube along the passage to seat the core tube in the socket.

4. An extruder, which comprises an extruding head having a core passage extending therethrough and also provided with a socket, a core tube designed to seat in the socket and having a peripheral projection extending laterally outwardly from the end thereof, a draw tube mounted in the passage, a collet having outwardly urged fingers having hooks on the ends thereof secured to the draw tube for engaging the projection on the core tube, means for moving the draw tube along the passage, and means for moving the hooks over the projection on the core tube as the draw tube is advanced along the passage to pull the core tube into seating engagement with the socket.

5. An extruder, which comprises an extruding head having a core passage therethrough, a die mounted in one end of the passage, a core tube holder locked in the other end of the passage, said holder having a tapered socket therein, a core tube having a tapered camming portion complementary to the tapered socket and also being provided with a shank having a collar projecting outwardly therefrom, a latching tube having outwardly urged spring fingers having collar-receiving notches, means for pulling the latching tube along the passage, and means for moving the spring fingers inwardly into engagement with the collar as the draw tube is moved along the passage in a direction such as to seat the core tube in the socket.

6. An extruder, which comprises an extruding heat having a core passage through which a core may be advanced from an entrance end thereof to an exit end thereof, said head being provided with a socket of a predetermined size concentric with the passage at a point intermediate the ends of the passage, said passage having a portion at the end thereof located between the socket and the entrance end of the passage and tapering from a large diameter to a smaller diameter from the socket end thereof toward the entrance end thereof, a core tube having a portion designed to seat in said socket and also being provided with a shank portion having an exterior collar portion, a sleeve having a plurality of spring fingers provided with hooks on the ends thereof extending from a point beyond the entrance end of the passage to the tapered portion of the passage, and means for moving the sleeve along the passage in such a direction that the wall of the tapered portion of the passage cams the hooks over the collar portion on the core tube and the sleeve pulls the core tube into the socket.

7. An extruder, which comprises an extruding head having a core passage through which a core may be advanced from an entrance end thereof to an exit end thereof, said head being provided with a socket of a predetermined size concentric with the passage at a point intermediate the ends of the passage, said passage having a portion at the end thereof located between the socket and the entrance end of the passage and tapering from a large diameter to a smaller diameter from the socket end thereof toward the entrance end thereof, a core tube having a portion designed to seat in said socket and also being provided with a shank portion having an outwardly projecting collar near the end thereof, a sleeve having a plurality of outwardly extending spring fingers provided with inwardly directed notches in the ends thereof extending from a point beyond the entrance end of the passage to the tapered portion of the passage, and means for reciprocating the sleeve in the passage.

8. An extruder, which comprises an extruding head having a core passage through which a core may be advanced from an entrance end thereof to an exit end thereof, said head being provided with a socket of a predetermined size concentric with the passage at a point intermediate the ends of the passage, said passage having a portion at the end thereof located between the socket and the entrance end of the passage and tapering from a large diameter to a smaller diameter from the socket end thereof toward the entrance end thereof, a core tube having a portion designed to seat in said socket and also being provided with a shank, a collar positioned on the end of the shank, a sleeve slidable in the passage, a collet secured to the sleeve having a plurality of spring fingers provided with notches designed to fit over the collar, and means for pulling the sleeve along the passage toward the entrance end of the passage, whereby the tapered portion of the passage closes the fingers on the collar.

9. An extruder, which comprises an extruding head having a core passage through which a core may be advanced from an entrance end thereof to an exit end thereof, said head being provided with a socket of a predetermined size concentric with the passage at a point intermediate the ends of the passage, said passage having a portion at the end thereof located between the socket and the entrance end of the passage and tapering from a large diameter to a smaller diameter from the socket end thereof toward the entrance end thereof, a core tube having a portion designed to seat in said socket and also being provided with a shank portion having an exterior annular projection near the end thereof, a sleeve having a plurality of spring fingers provided with hooks on the ends thereof extending from a point beyond the entrance end of the passage to the tapered portion of the passage, means splining the sleeve to the extruding head, a pin projecting from the portion of the sleeve at the entrance end of the passage, and cam means for pressing the pin to move the sleeve axially of the passage.

10. An extruder, which comprises an extruding head having a core passage through which a core may be advanced from an entrance end thereof to an exit end thereof, said head being provided with a socket of a predetermined size concentric with the passage at a point intermediate the ends of the passage, a core tube having a portion designed to seat in said socket and also being provided with a shank, a sleeve extending from a point beyond the entrance end of the passage into the passage, said shank and said sleeve being provided with interlocking portions for the transmitting thrust from the sleeve to the shank, and means for pulling the sleeve to seat the core tube in the socket and pushing the sleeve to push the core tube away from the socket.

11. An extruder, which comprises an extruding head having a core passage therethrough and a socket intermediate the ends thereof, a core tube designed to fit into the socket, a draw member extending from the entrance end of the core passage substantially to the core tube, quick-detachable interlockable elements secured to the core tube and the draw member for connecting the core tube to the draw member, and means positioned at the entrance end of the passage for pulling the draw member to seat the core tube in the socket.

References Cited in the file of this patent

UNITED STATES PATENTS

| | | |
|---|---|---|
| 1,984,038 | Shaw et al. | Dec. 11, 1934 |
| 2,239,408 | Wallace | Apr. 22, 1941 |
| 2,332,538 | Smith | Oct. 26, 1943 |
| 2,550,555 | Hallam et al. | Apr. 24, 1951 |
| 2,560,778 | Richardson et al. | July 17, 1951 |
| 2,574,555 | Galloway | Nov. 13, 1951 |

FOREIGN PATENTS

| | | |
|---|---|---|
| 297,590 | Great Britain | Sept. 27, 1928 |